United States Patent [19]

Solomon

[11] 3,818,442

[45] June 18, 1974

[54] ERROR-CORRECTING DECODER FOR GROUP CODES

[75] Inventor: Gustave Solomon, Los Angeles, Calif.

[73] Assignee: TRW Inc., Redondo Beach, Calif.

[22] Filed: Nov. 8, 1972

[21] Appl. No.: 304,788

[52] U.S. Cl. .............. 340/146.1 AL, 340/146.1 AV

[51] Int. Cl. .............................................. G06f 11/12

[58] Field of Search .......... 340/146.1 AL, 146.1 AV

[56] References Cited

UNITED STATES PATENTS

| | | | |
|---|---|---|---|
| 3,457,562 | 7/1969 | Fano | 340/146.1 AV |
| 3,622,982 | 11/1971 | Clark et al. | 340/146.1 AL |
| 3,648,236 | 3/1972 | Burton | 340/146.1 AV |
| 3,668,632 | 6/1972 | Oldham | 340/146.1 AV |

*Primary Examiner*—Charles E. Atkinson
*Attorney, Agent, or Firm*—Daniel T. Anderson, Esq.; Edwin A. Oser, Esq.; Jerry A. Dinardo

[57] ABSTRACT

A multiple error-correcting decoder for group codes. The decoder does not attempt to determine error positions in the transmitted group code word, instead the transmitted code word or vector is operated on by a multiplier or mask so as to blank out or obliterate possible error positions. Subsequently, the code word is reconstituted by a recursion relation. Finally the Hamming distance between all the newly generated code vectors and the received code word is calculated, and the new vector with the least Hamming distance is selected as the most likely original code word. The decoder can be realized either by a simultaneous decoder or by a cyclic decoder. It can be shown that such a multiplier exists for group codes over an algebraic finite field and a procedure is disclosed for realizing such a multiplier. The recursion relation may be built into the multiplier so that in a single step the received vector can be multiplied and reconstituted. The new decoder has the advantage of great flexibility. It requires a minimum of hardware and decoding can be effected at the rate of 300 megabits per second.

13 Claims, 5 Drawing Figures

ERROR-CORRECTING DECODER FOR GROUP CODES

BACKGROUND OF THE INVENTION

This invention relates generally to decoders for multiple error-correcting cyclic codes and particularly relates to such a decoder characterized by simplicity and a very high bit rate.

Error-correcting codes of the cyclic type are well known in the art. Such cyclic codes usually exist over an algebraic finite field. The code may have binary or digital numbers or it may consist of selected symbols such as an alphabet. The code may be based not only on binary numbers but also on quarternary or generally *n*-ary numbers.

Such codes are used for transmitting information. For example, the information may be transmitted over a telephone wire, a telecommunication link or the like, that is by radio between two stations or between a satellite and ground or a space ship and ground. In the transmission of such information errors naturally occur and many codes have been devised which are capable of correcting a predetermined number of errors in each transmitted code word or vector. Such error-correcting codes have been described in the literature, for example, in the following books: Error-Correcting Codes, W. Wesley Peterson, The M.I.T. Press, Cambridge, Mass. 1961, Fourth Printing June 1968 and Algebraic Coding Theory by Elwyn R. Berlekamp, McGraw-Hill Book Company, New York.

Not only have many such codes been devised in the past but procedures have been developed for decoding a received code word for the purpose of correcting a predetermined number of errors or of determining the total number of errors which may be larger than the correctable errors. For example, these errors can be discovered and corrected by the so-called Chien search described, for example, on pages 132 to 135 of the Berlekamp book above referred to. The decoder of the Chien search calculates a certain polynomial which may be called the error locator. The roots of the error locator are the reciprocals of the error locations in the transmitted vector. The Chien search may be used to check each location to see if the digit is the reciprocal of the root of the error locator. The problem is to find the error locator polynomial. The actual decoder for the Chien search does require a Galois field processor.

Additionally, Berlekamp gives a procedure for decoding, for example, the Reed-Solomon code and the BCH (Bose, Chaudhuri and Hocquenghem) code. The decoding procedure requires essentially a special purpose computer which must compute through a set of algebraic computations requiring addition and multiplication as well as root finding. In other words, one has to construct a polynomial existing in a Galois field, then one must find the roots of these polynomials. The error positions may be discovered and subsequently the errors may be corrected.

This procedure generally requires that the code must have certain mathematical properties because otherwise it cannot be decoded in this manner. This, of course, limits the use of error-correcting codes. All such codes contain a certain number of information bits and another number of bits which may be called check or parity bits. The aim in finding a good code is to find a code which has a high rate of information bits compared to the total number of bits of each code word and yet corrects a desired number of errors. Hence, it will be evident that the limitations of the decoding procedure requiring certain mathematical properties of the code have limited the use of codes which might otherwise be attractive.

Another decoding procedure having multiple error-correcting cyclic codes has been proposed by T. Kasami (see IEEE Transactions on Information Theory, Apr. 1964, pages 134 through 138). The decoding scheme is particularly useful where the minimal Hamming distance is relatively large with respect to the code length. According to the decoding method one chooses a set of polynomials such that a certain member of the polynomial agrees with the error pattern polynomial or cyclic shift thereof. However, there is no general procedure shown for finding such a set of polynomials required for the decoding procedure. The decoding is somewhat inefficient and hence requires a relatively long time. Furthermore, in order to carry out the procedure a relatively large memory is required. What has been said above about other decoding methods also applies, that is the Kasami method looks for particular error positions.

Another disadvantage of conventional decoders is that the data rates obtainable for the decoding procedure is in the range of a few megabits per second. This either means that the data transmission has to be relatively slow or else that the received data must be stored and cannot be decoded in real time.

It is accordingly an object of the present invention to provide a decoding procedure and decoding circuits for group codes over any finite algebraic field which does not attempt to determine the error positions of a received code word but simply to obtain the true code word.

Another object of the present invention is to provide a decoder for such group codes which permits to decode data transmitted at rates on the order of 300 megabits per second and which may readily be implemented either in the form of a simultaneous decoder or a cyclic decoder having a lower data rate.

A further object of the present invention is to provide an error-correcting decoder of the type discussed which features a multiplier or mask to obliterate possible error positions of a received code word and which simultaneously reconstructs the code word in accordance with an algebraic recursion procedure which yields multiplying rules for the mask, thereby to correct directly the errors of a received word without the necessity of first determining the error positions.

Still another object of the present invention is to provide an error-correcting code as discussed herein which permits to correct more errors than prior art decoding procedures.

Still a further object of the present invention is to provide a decoding procedure which decodes certain group codes which have been too difficult to decode in the past.

SUMMARY OF THE INVENTION

The decoder of the present invention is capable of decoding any code over an algebraic finite field. The code may be a cyclic code. It should be noted that the term cyclic code as used herein and in the claims is meant to include an extended cyclic code. In accordance with the decoding procedure a multiplier code is assigned to the particular code to be decoded. Subsequently examples will be given of such multipliers as well as the general procedure for finding such a multiplier for any cyclic code over a finite field. Preferably, the multiplier or mask is cyclic, that is it may be cyclically shifted, for example, in a shift register so that the first digit of the multiplier vector becomes the last digit. This procedure is repeated until the entire multiplier has been cyclically shifted. Instead of cyclically shifting the multiplier it is feasible to shift the received code word.

It should be particularly noted that instead of looking at all possible vectors of the received code word, it is only necessary in accordance with the present invention to test a relatively small subset of vectors of the code word having the length of the code word. This procedure will obviously much decrease the hardware necessary to carry out the procedure and will reduce the time required for the deocding.

The received code word is now multiplied with the various vectors of the multiplier, digit by digit. This multiplication may be effected by using special multiplying rules. This simply means that certain positions of the received code word which have been obliterated by the multiplier, that is which have been turned into zero are subsequently reconstituted. This reconstituted is based on certain recursion relations realized by a set of linear equations. This sub routine is simply based on the fact that successive code words in a cyclic code are related to each other by a set of linear equations.

It is now possible to multiply the received code word simultaneously with all multiplier vectors. In that case a plurality of new vectors are calculated and their Hamming distance from the received code word is determined. The new vector with the lowest Hamming distance is assumed to be the original code word. This procedure requires more hardware but is obviously very fast and permits very high decoding speeds.

Alternatively, it is feasible to multiply the received code word cyclically with the various vectors of the multiplier or to multiply the cyclically shifted code word with one and the same multiplier vector. This procedure requires much less hardware; but on the other hand the decoding time is longer.

The decoding procedure outlined herein may be readily realized by existing hardware.

It will also be shown that such a multiplier exists for any cyclic code over a finite field and how such a multiplier may be obtained.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
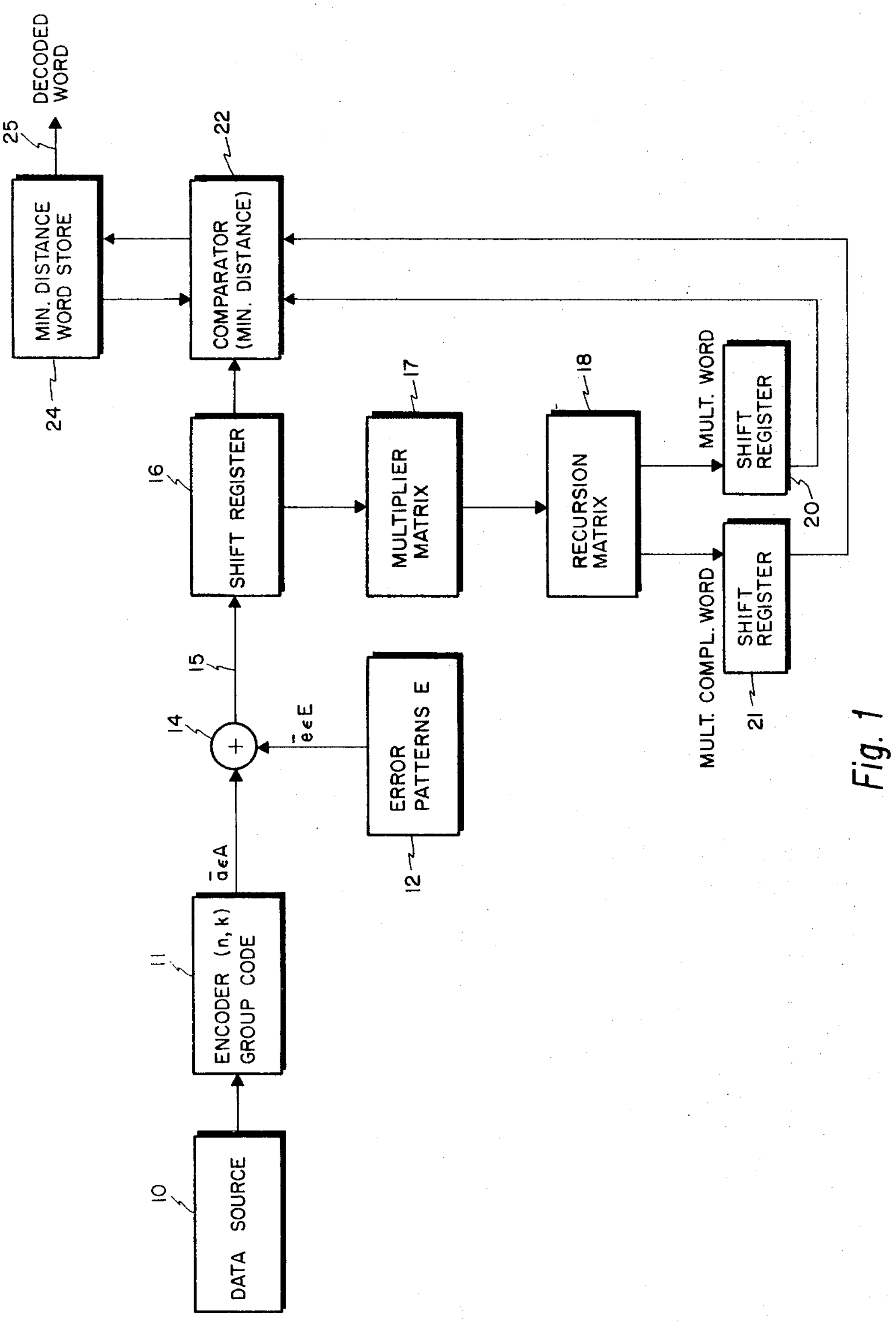
FIG. 1 is a block diagram of a data transmission link showing how the original data is encoded and how it may be decoded in accordance with the present invention.

Before turning to the drawings which illustrate in block form various embodiments of the invention, it will first be desirable to describe the general coding theory as well as the specific method of the present invention.

The present invention directs itself to the problem of decoding cyclic codes over an algebraic finite field. A field may be defined as a set of elements including 0 and 1, any pair of which may be added, subtracted, multiplied or divided to give a unique result in the field. The operation of addition and multiplication are associative and commutative and there are further rules which need not be described here. The number of elements in the field is called the order of the field. If the field has a finite order or a finite number of elements it is called a finite field.

Such an algebraic finite field deals with symbols which may, for example, be binary or ternary numbers, $n$-ary numbers or the like. The general, finite field is called the Galois field. Thus, if $p$ is any prime and $k$ is any integer, there exists a unique finite field of order $p^k$. This is the Galois field of order $p^k$ and is denoted by $GF(p^k)$.

Among the codes which have been developed, cyclic codes (including extended cyclic codes) are more simply mechanized and have been used most frequently in the past. A code word may be considered as a cyclic subspace of a field and made up of $n$-tuples. Generally, a code is defined by the letters $(n,k)$ where $n$ is the length of the code word and $k$ its dimension or the number of information bits. Hence, $n-k$ is the number of check bits. Also, the quantity d is often referred to. It may, for example, be expressed as $2e + 1$ (for $d$, odd) where e is the number of correctable errors. The distance referred to is the so-called Hamming distance. The Hamming distance between two words is defined as the number of positions or bits in which the two words or vectors differ from each other. Therefore, the quantity d defines the minimum Hamming distance between code words of a given code which is necessary to correct $e$ errors.

The present invention directs itself toward the decoding of all group codes over a finite field. The so-called multiplier or mask of the present invention must have certain properties. Preferably, the multiplier is cyclic which much simplifies the decoding procedure. Also, it should be pointed out that there may be several possible multipliers for any given code.

In that case the most practical or the best code should be selected. The decoder of the invention uses a number of vectors of the multiplier as well as a recursion relation for reconstituting the obliterated positions of the received code word. This can all be effected by MOD 2 addition and comparison. Thus, for any $(n,k)$ cyclic code A which corrects e errors one assigns a multiplier code M of length n and dimension $(e+1)$ which is often binary and which has the property that the received code word multiplied with the vectors of M yields a new error-free vector from which the original transmitted code word can be recovered. This recovery includes as indicated above the recursion relation.

Given a cyclic code, $(nk;d)$ where n is the length $k$ is the dimension, $d$ is the minimum Hamming distance between words, $d$, expressed as $d=2e+1$, $e$ is the number of algebraically correctable errors, over any field K. There always exists a multiplier code M, i.e., an $(n,e+1;k)$ code over the field $GF(2^m)$ where $m = [\log (n)]+1$. The multiplier M code to be used in a decoding machine is preferred to be a set of binary vectors which are cyclic subsets of a multiplier code over the smallest field obtainable. If this field is not binary (i.e., GF (2)), then vectors of the code can be identified by scalar multiplication and made binary via raising to the required power (order of field minus one). An example are the multipliers for the (16,12:5) code.

For codes of rate $\leq 1/2$ and $e$ less than log $n$, then a binary code always exists as multiplier and there are at most $(2^{e+1}-2)$ vectors.

The utility of the decoder is a function of the number of multipliers or multiplier codes necessary. For example, to correct one or two errors, at rates greater than one-half the algebraic technique may be simpler and faster. The strength of the decoder of the invention is for cases of high errors, for correcting beyond the minimum distance, or for non-binary field codes which are very efficient in the ratio of correctable errors to length and information rate. An example is the (32,12) Reed-Solomon code over $GF(2^5)$ which corrects 10 errors. The multiplier set is the extended BCH (32,11) code. The number of multipliers is $(2^{11}-2)$ and the number of cyclic generators is this number divided by 31 or 62. A parallel procedure would make this code real time in decodability and as fast as the transmission.

In general, the most efficient coder and decoder schemes are those that correct e errors with $2^{e+1}-2$ multipliers. For rates larger than one-half, this is usually not possible.

It should be noted that the decoder procedure of the invention not only is capable of correcting $e$ correctable errors but also in addition some formerly only detactable s errors. Thus, if a detectable s error pattern falls in the zeros of a multiplier M then it too will be correctable. If the multiplier code has dimension t greater than or equal to $e+1$ the decoding will correct up to all $t-1$ correctable error patterns.

It can be proven that for the proper multiplier code M this can be done. For example, the standard Golay (24,12) code, Reed-Muller (32,16) code and Reed-Solomon (16,8) code over $GF(2^4)$ can be decoded, for example, by the procedure of the invention. The decoding speed is in excess of 300 megabits per second. This decoding may take place in essentially one decoding step when high speed operation is required. It should also be noted that error patterns formerly not decodable by prior art methods now are decodable with the same decoder of the present invention. For example, the second order Reed-Muller (32,16) code is correctable for three errors using prior art methods. According to the present invention it is also decodable to 70 percent of all four error patterns and 83 percent of all five error patterns. The improvement is 2 db for the $10^{-5}$ bit error probability requirements over conventional correction procedures.

It should be noted once again that all that is necessary is to generate new vectors consisting of the received code word multiplied by the set of vectors of the multiplier or by multiplying the cyclically shifted received code word with the same multiplier vector. As will be shown subsequently this in general is a relatively small number of vectors which has to be considered.

This is effected by multiplying the received code word $\overline{a}$ by a set of $j$ multipliers $\overline{m}$; where $i$ equals 1,2, . . . j. The multiplied vector $\overline{a} \times \overline{m}_i$ is then operated on by the recursion relation to obtain the possible code word $\overline{a_i}$. The closest one of all the $\overline{a_i}$ 's to the received vector $\overline{a}$ is then selected as the decoded word. This selection is made by a Hamming distance calculator well known in the art.

The set of $j$ multipliers or the multiplier vectors are so selected as to minimize the required hardware and the time of decoding.

If M is a multiplier code for the $(n,k)$ Code A each non-zero vector $\overline{m}$ used must have a weight greater or equal to $k$. This is a sufficient condition for Reed-Solomon codes. Among the standard codes which may be decoded by the procedure of the invention are the following: Golay (24,12), the Quadratic Residue (48,24) code, the Reed-Solomon codes (16,8). (32,12), (32,24), as well as the (32,16) Reed-Muller code and the (31,11) BCH code.

At this time it will be convenient to give a few examples of how the required multiplier can be found for various codes. In general the required multiplier can be found by the Reed-Solomon code which exists over a Galois field. The Reed-Solomon code in turn is a special case of the BCH code.

The (16,12) Reed-Solomon code over GF $(2^4)$ corrects two symbol errors, that is $e$ is 2. It turns out that the (16,3) quaternary code has a minimum distance 12 and is the required multiplier. We now have $4^3$ possible multipliers or multiplier vectors. One can eliminate 4 constant vectors. By identifying the vectors under scalar GF (4) multiplication, we obtain a set of (64–4)/3 or 20 vectors. If we now cube each vector we obtain 20 vectors of weight 12 (the weight of any word is the number of 1's among its digits) and the vectors are binary. Fifteen of these vectors are cyclic shifts of one vector over the first 15 digits. Five vectors are cyclic shifts of the other, keeping the 16th portion or overall parity check fixed. Accordingly, this set of 20 vectors of the multiplier will decode and error correct the (16,12) Reed-Solomon code.

The (32,16) Reed-Muller binary code of distance 8 corrects all three error patterns; it also corrects some four and some five error patterns. There exists a (32,6) biorthogonal code of distance 16. This may also be called an extended BCH code. This code under a suitable permutation should form a set of vectors which provides the required mask or multiplier. The use of the Mattson-Solomon polynomial yields the required extended BCH code.

This is generated by $f_{-1}(x)\,(x+1)$, if the generator for the Reed Muller code is given as follows: $(x+1)\,f_1(x)\,f_3(x)\,f_5(x)$ when $f_i(x)$ is the irreducible polynomial such that $f_i(\beta^i)=0$ for any choice of $\beta$.

However, the rules given above are not rigid. In some cases it is possible to guess the required multiplier. This may, for example, be effected by trying obvious cyclic sequences. For example, the (12,6) Reed Solomon code of distance 7 corrects 3 errors. The natural multiplier code M is a (12,4) punctured Solomon-Stiffler code of distance 6. This consists of 15 multipliers, is non-cyclic, but does the job.

One also notes that the sequence 11011000100 and its complement as well as the 11 cyclic shifts of the first eleven coordinates or digits of each vector will generate 22 vectors. These vectors are of weight 6 and have the right multiplier property; namely, that every three error pattern has a vector which is 0 at these points. In other words, the errors could occur singly or two adjacent to each other or three in sequence. Any such error patterns can be obliterated by the above sequence and its set of vectors. Accordingly, we have a natural set of multipliers of 22 vectors obtainable by two cyclic generators.

By way of example, a multiplier set will now be discussed. Let M be the $(2^k - 1, k + 1)$ BCH code or the extended $(2^k, k + 1)$ BCH code. Both of these have the property that all k error patterns are zeros and some vector with weight $2^{k-1} - 1$ or $2^k$. In addition one may choose one of these vectors and its complement so that all other multiplying vectors of M are cylic shifts of the initial $(2^k - 1)$ length portion of the code. However, vectors consisting of all zeros and all ones are excluded as multipliers. This set of $(2^{k+1} - 2)$ vectors is very useful for error correcting codes of distance $2k + 1$ if the rates are less or equal to one half.

It will now be appreciated that the multiplier set is a cyclic set which is derived from two generators, that is one vector and its complement. This is one reason why the decoding can be mechanized in real time with a minimum of equipment.

The following examples use this class of multipliers derived from the BCH code.

Let the code be a (16,8) Reed-Solomon code of $GF(2^4)$ with a distance 9. This code corrects four errors. The multiplier M is a (16,5) extended BCH code. This code corrects all four error patterns, one third of all five error patterns and one eleventh of all six error patterns.

One of the code vectors $\overline{m}$ may be as follows: (0,0,0,1,0,0,1,1,0,1,0,1,1,1,1,) and its complement. These two vectors are the generators of the 30 multiplying vectors which constitute the set of code M. The parity generation rules for the Reed-Solomon code may be hard wired for each vector.

Now let the code be the (32,16) second order Reed-Muller code which corrects three errors. The multiplier code may be the (32,6) extended BCH code. This consists of 62 vectors of weight 16.

It should be noted that it is important that the multiplier M be so selected that $\overline{a}_i$ is recoverable from $\overline{a}_i \times \overline{m}_i$.

For this code it should be noted that errror patterns up to five may be corrected. If M is selected to be the (32,5) code, the decoding is simpler to mechanize; however only three eights of all correctable five error patterns can now be corrected.

For the next example we will assume that A is the (31,11) BCH code of distance 11. Alternatively A may be the (32,11) extended code of distance 12. Then M is the multiplier code used in the previous example.

Assuming now that A is the Golay (23,12) code of distance 7, in this case M consists of the cyclic shifts of the vector $\overline{m}$ and its complement. Here $\overline{m}$ is the vector (Tr $x$; $x = \beta^i \int$ where $\beta$ is the primitive 23 root of unity. If we take the Golay (24,12) code as A then M is m with the 24 bit as the overall parity check. In this case all three error patterns are correctable and a fraction of all correctable four error patterns.

Now assume that A is the Quadratic Residue code (48,24) with a distance of 12. Here a group code of dimension 6 and length 48 will suffice. However, in order to recover the transmitted code word it is necessary that all vectors have a weight of 24 or greater. Accordingly, the 24 positions would have to be a generative set for the code. There exists a (48,6) punctured Solomon-Stiffler code of minimum distance 24 which is a candidate for the multiplier code. This is a non-cyclic code set and consists of 63 vectors. Alternatively, by analogy with the Golay code procedure, we chose the (Tr $x$; running through the 47 roots of unity) vector.

Now we can take all 47 cyclic shifts and their complements. A 48th bit may be added which is the MOD-2 sum of all the coordinates.

This set of multipliers will correct all four error patterns but not all five error patterns. Consequently, we choose a permutation of this code word as the basis for an additional set of cyclic multipliers, that is new vectors forming a non-linear set which corrects 99 percent of all five error patterns and over 90 percent of all six error patterns. With these multipliers the (48,24) Quadratic Residue code is a better rate one-half code than its related code, the Golay (24,12) code.

If the data transmission system demands codes with rates greater than one half more complex multipliers can be constructed. This may, for example, be a "concatenated" multiplier for the (32,24) Reed-Solomon code over $GF(2^5)$. We need vectors of weight 24 and dimension 5 or more to obtain the four error corrections given by the code.

First we select the (32,5) extended BCH code as the multiplier. All four error patterns are contained in the weight zero coordinates of the 31 weight 16 vectors. Now looking at the 16 zeros of any particular vector and treating these as the length 16 vector we choose a multiplier to correct four errors.

The (16,5) extended BCH code will be sufficient. The (15 × 2) vectors of the (16,5) code can be run through for each set of zeros of the 31 vectors of the (32,5) code. This may be effected in 31 × 15 identical steps. By picking 24 positions of the inner and outer code one can generate effectively 31 multipliers by cyclically shifting the cyclic portion of the Reed-Solomon code word. Then the 24 positions may be changed and run again through 31 shifts. Since there are a total of 31 × 30 vectors in the multipliers this must be done 30 times or 30 separate generators may be used in parallel.

After this discussion of the theory of the present invention and several examples of multipliers in accordance with the invention, reference is now made to the drawings. FIG. 1 shows a data transmission system analogous to a Shannon Communication System which is decodeable in accordance with the present invention. Thus there is shown a data source 10 and an encoder 11. The encoder 11 encodes the data in accordance with an $(n,k)$ group code and is conventional. Thus as explained in the drawing $\overline{a} \epsilon$ A means that the code word $\overline{a}$ belongs to the code A.

As shown schematically in FIG. 1, the box 12 represents the error patterns E, that is the errors which are somehow introduced in the code word during transmission. As indicated schematically $\overline{e} \epsilon$ E, that is a particular error $\overline{e}$ is added by the summer 14 to the transmitted code word $\overline{a}$. The transmission 15 may be any data transmission network such, for example, as a radio link, a wire or the like.

The received code word which may contain one or more errors $\overline{e}$ is now held in a shift register 16. The received code word is then transferred to the multiplier matrix 17 which multiplies the received code word with the set of multiplier vectors as previously discussed. Subsequently, the multiplied code word is transferred into a recursion matrix 18. Here the multiplied code word is regenerated. In other words, by a well known linear recursion relation those positions of the code word which have been obliterated by the multiplier vector are reconstituted.

It will be understood that the multiplier matrix 17 and the recursion matrix 18 may be combined. In other words, each of the multipliers of the decoder may have built in the necessary multiplication rules required by the recursion relationship.

Generally, although not necessarily, the multiplier may consist of a vector and its complement both being shifted in a cyclic manner. Alternatively instead of cyclically shifting the multiplier, the code word may be cyclically shifted. Accordingly, the multiplied and reconstructed word may then be maintained in a shift register 20 for the multiplied word. A similar shift register 21 receives the multiplied complementary word, that is the word which has been multiplied with the vector complement. A comparator 22 now compares the Hamming distance between the received code word maintained in shift register 16 and the multiplied word or the multiplied complementary word received respectively from registers 20 and 21. The newly generated word with the minimum Hamming distance is then stored by the minimum distance word store 24 which may be a holding register. The decoded word may then be received from output terminal 25.

It should be understood that the decoding may be carried out cyclically so that the received code word is only multiplied at one time by one multiplier vector and its complement. In this case the comparator 22 will have to continue comparing the received code word with the multiplied and multiplied complementary words from registers 20 and 21 until the decoding is finished. Thus, it may be necessary to change the minimum distance code word previously received in store 24 as the decoding proceeds.

On the other hand it is feasible and may in some cases be more desirable to make use of a simultaneous decoder. In this case the multiplier 17 and the recursion matrix 18 both may consist of a matrix which permits decoding simultaneously by the entire set of multiplier vectors. In that case it is only necessary to determine the minimum Hamming distance by the comparator 22 over all the multiplied words and all the multiplied complementary words which has been effected simultaneously.

The recursion relation required for the matrix 18 is well known in the art. Thus the actual recursion relation is shown in Appendix C of the book by Peterson beginning on page 251. The recursion relation required for the matrix 18 is a function of the recursion polynomial of the code, i.e., the generating rule for parity checks and the values of the multiplier code word. For a particular code and multiplier system, it is evaluated in advance through straight algebraic calculation or computer program. In either case, the particular relation required for the code to be decoded can simply be hardwired into the multiplier matrix.

FIGS. 2 through 5 to which reference will now be made, show somewhat more detailed block diagrams for the decoding of a particular code; namely, the Golay (24,12) code. However, it is to be distinctly understood that this is only a particular example and that other codes may be decoded in a similar manner. Many examples have been given herein for decoding many other conventional codes.

The multiplier set for this Golay code is a (24,4) binary group code having a minimum Hamming distance of 12. The received vector or code word $\overline{r}$ may be denoted as follows: ($\overline{r} = r_0 \, r_1 \, r_2 \ldots r_{23}$). This is the transmitted vector or code word corrupted by error pattern of three or fewer errors. In addition, the vector $\overline{r}$ can be reconstructed from the product vector $\overline{r} \times \overline{m}$. There exists one vector $\overline{m}$ which belongs to the set M and which is zero at the error positions; hence $\overline{r} \times \overline{m}$ is error free.

Figure 2:
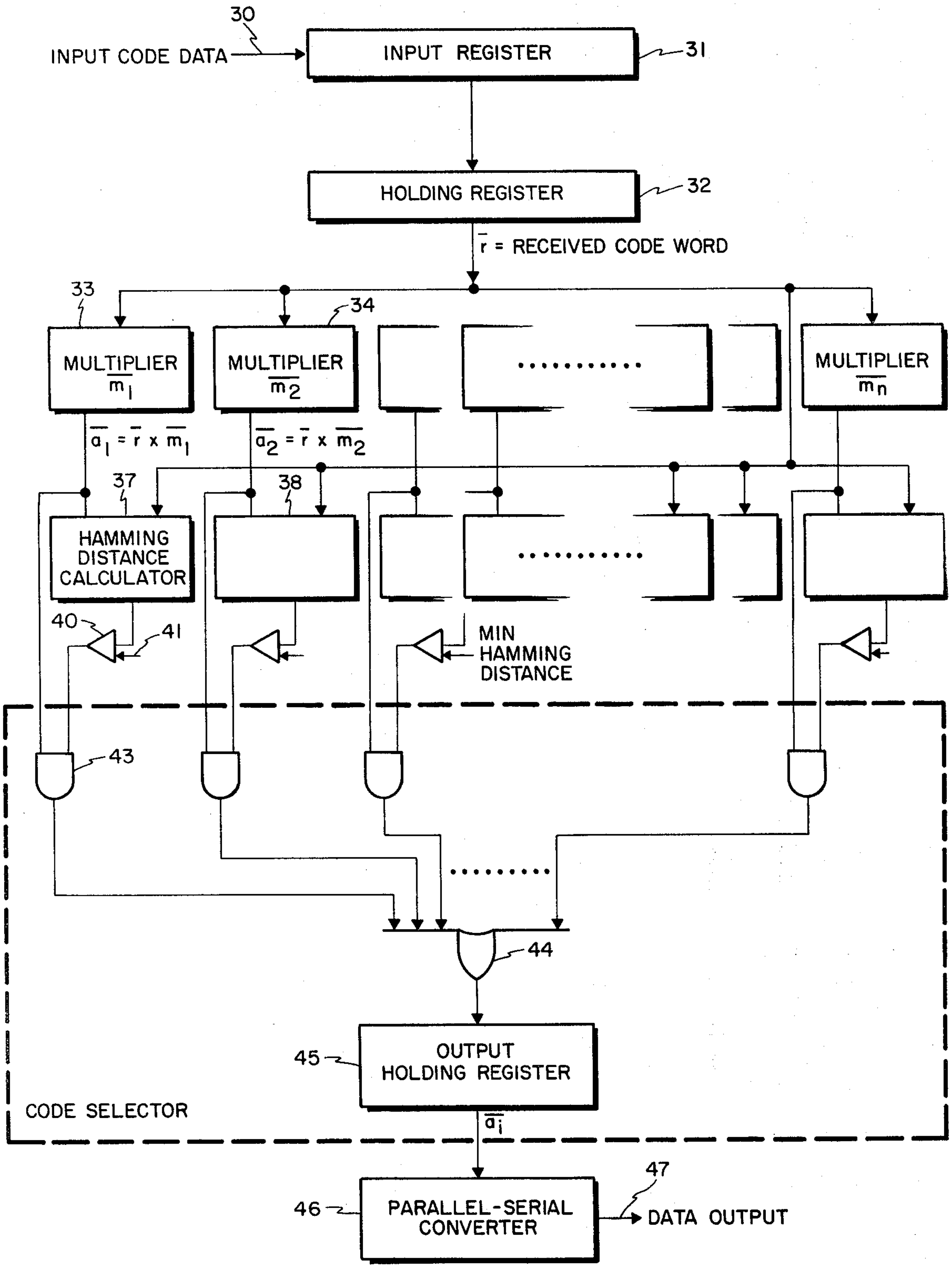
FIG. 2 is a block diagram of a simultaneous decoder in accordance with the present invention, particularly suited for a Golay (24,12) code.
Figure 3:
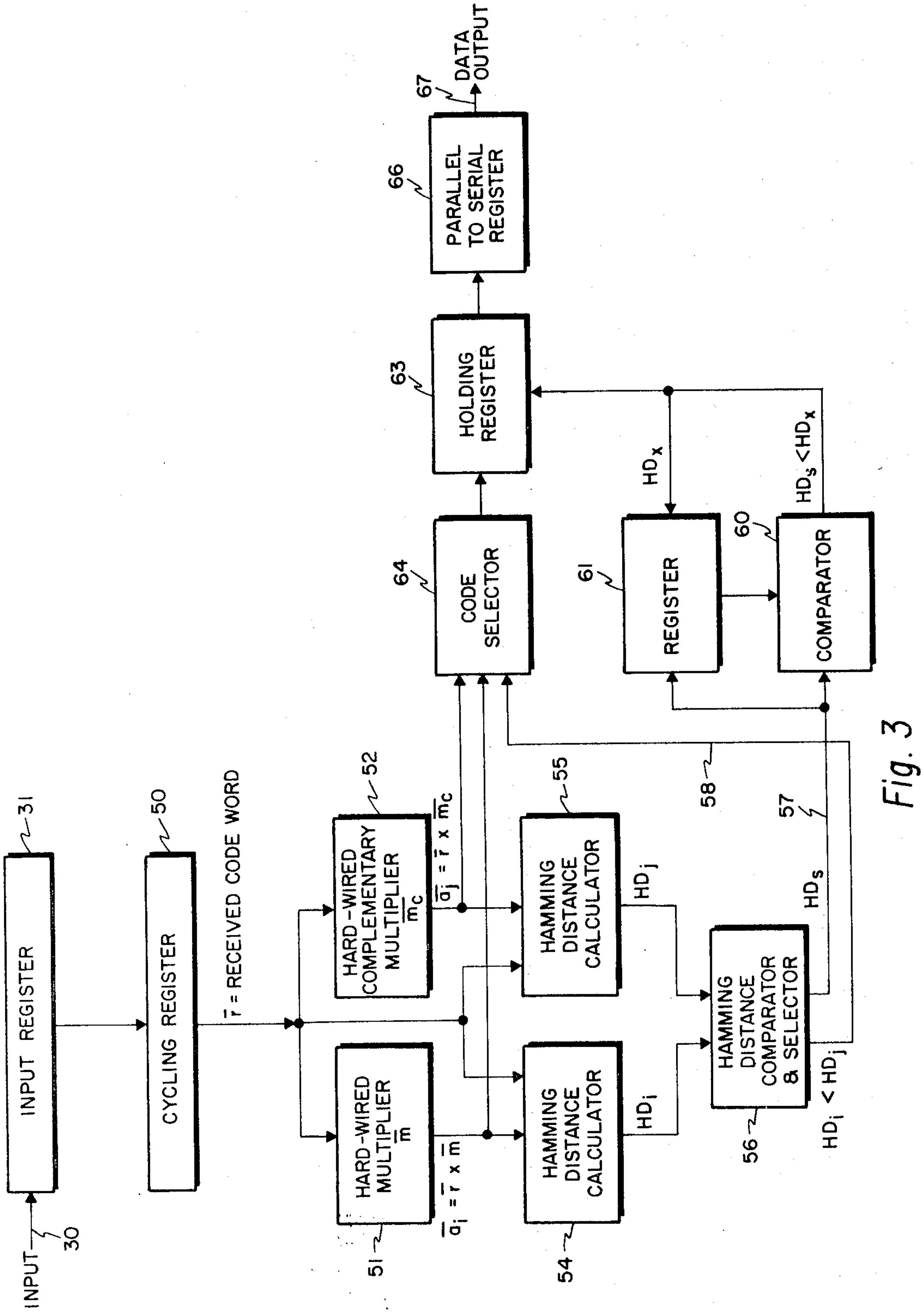
FIG. 3 is a block diagram of an alternative decoder in accordance with the present invention where the received code word is cyclically decoded for the same Golay (24,12) code.

Simultaneous decoding for such a code is illustrated in block form in FIG. 2 while FIG. 3 shows in block form a cyclic decoder for the same code. Obviously, a simultaneous decoder can operate at a very high speed but requires more hardware. On the other hand, a cyclic decoder requires a minimal number of multipliers but needs more time for the decoding.

By using the binary (24,4) multiplier code M and the necessary recursion rule the following 7 multiplier vectors may be obtained:

TABLE I

| | |
|---|---|
| $\overline{m}_1$=(1 0 0 0 0 1 0 1 0 0 1 1 0 0 1 1 0 1 0 1 1 1 1) | and 24th bit=0 |
| $\overline{m}_2$=(0 0 0 0 1 0 1 0 0 1 1 0 0 1 1 0 1 0 1 1 1 1 1) | |
| $\overline{m}_3$=(0 0 0 1 0 1 0 0 1 1 0 0 1 1 0 1 0 1 1 1 1 1 0) | |
| $\overline{m}_4$=(1 0 0 0 1 1 1 1 0 1 0 1 0 1 0 1 1 1 1 0 0 0 0) | |
| $\overline{m}_5$=(1 0 0 1 1 0 1 1 1 0 0 1 1 0 0 0 1 0 0 1 1 1 0) | |
| $\overline{m}_6$=(1 0 0 1 0 0 0 1 1 1 1 1 1 1 1 0 0 0 1 0 0 0 1) | |
| $\overline{m}_7$=(0 0 0 1 1 1 1 0 1 0 1 0 1 0 1 1 1 1 0 0 0 0 1) | |

From the above 7 multiplier vectors and their complements the 14 multipliers ($\overline{m}_1$, $\overline{m}_2$, . . . . of FIG. 2) necessary for the decoding may be generated.

Referring now specifically to the simultaneous decoder, reference is made to FIG. 2. The input code data or the code words are received on a lead 30 and are stored in input register 31. From register 31 the received code word is transferred to a holding register 32. As shown there $\overline{r}$ is the received code word. Thus register 31 is the input buffer which will receive code word after code word from input data. After the register 31 is filled the 24-bit code vector $\overline{r}$ is parallel loaded into the holding register 32.

The holding register 32 is now connected to 14 multipliers 33, 34 . . . Each of the multipliers multiplies the received code word with one of the 14 vectors such as $\overline{m}_1$, $\overline{m}_2$,..... $\overline{m}_n$. Accordingly, the output of say multiplier 33 is $\overline{a}_1$ obtained from $\overline{r} \times \overline{m}_1$ etc.

It will be understood that each of the multipliers such as 33,34 is hard wired in accordance with the applicable recursion rule. These multiplication rules as an example for $m_6$ are shown by Table II as follows:

TABLE II

| | | | | | | | | | | | | | | | | | | | | | | | |
|---|---|---|---|---|---|---|---|---|---|---|---|---|---|---|---|---|---|---|---|---|---|---|---|
| 1 | 2 | 4 | 5 | 6 | 15 | 16 | 17 | 19 | 20 | 21 | 23 | 0 | 3 | 7 | 8 | 9 | 10 | 11 | 12 | 13 | 14 | 18 | 22 |
| 1 | 0 | 0 | 0 | 0 | 0 | 0 | 0 | 0 | 0 | 0 | 0 | 1 | 0 | 0 | 0 | 1 | 1 | 0 | 1 | 1 | 0 | 1 | 1 |
| 0 | 1 | 0 | 0 | 0 | 0 | 0 | 0 | 0 | 0 | 0 | 0 | 1 | 1 | 0 | 1 | 0 | 0 | 0 | 1 | 1 | 1 | 0 | 1 |
| 0 | 0 | 1 | 0 | 0 | 0 | 0 | 0 | 0 | 0 | 0 | 0 | 1 | 0 | 1 | 1 | 1 | 0 | 0 | 1 | 0 | 1 | 1 | 0 |
| 0 | 0 | 0 | 1 | 0 | 0 | 0 | 0 | 0 | 0 | 0 | 0 | 1 | 0 | 1 | 1 | 0 | 1 | 1 | 1 | 1 | 0 | 0 | 0 |
| 0 | 0 | 0 | 0 | 1 | 0 | 0 | 0 | 0 | 0 | 0 | 0 | 1 | 0 | 0 | 1 | 0 | 1 | 1 | 0 | 0 | 1 | 1 | 1 |
| 0 | 0 | 0 | 0 | 0 | 1 | 0 | 0 | 0 | 0 | 0 | 0 | 1 | 1 | 1 | 1 | 1 | 1 | 0 | 0 | 0 | 0 | 0 | 1 |
| 0 | 0 | 0 | 0 | 0 | 0 | 1 | 0 | 0 | 0 | 0 | 0 | 1 | 0 | 1 | 0 | 1 | 0 | 1 | 0 | 1 | 1 | 0 | 1 |
| 0 | 0 | 0 | 0 | 0 | 0 | 0 | 1 | 0 | 0 | 0 | 0 | 1 | 1 | 1 | 0 | 0 | 1 | 0 | 0 | 1 | 1 | 1 | 0 |
| 0 | 0 | 0 | 0 | 0 | 0 | 0 | 0 | 1 | 0 | 0 | 0 | 1 | 1 | 0 | 1 | 1 | 0 | 1 | 0 | 1 | 0 | 1 | 0 |
| 0 | 0 | 0 | 0 | 0 | 0 | 0 | 0 | 0 | 1 | 0 | 0 | 1 | 1 | 1 | 0 | 0 | 0 | 1 | 1 | 0 | 0 | 1 | 1 |
| 0 | 0 | 0 | 0 | 0 | 0 | 0 | 0 | 0 | 0 | 1 | 0 | 0 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 1 | 1 | 1 | 0 | 0 | 1 | 1 | 1 | 1 | 0 | 1 | 0 | 0 |

The first line in Table II is the locator indicating the respective bit positions such as $r_o$, $r_1$ . . . .

As an example, let us use the multiplier vector $m_6$ from Table I. The new vector $\overline{a}_6$ equals $\overline{r} \times \overline{m}_6$. The new vector $\overline{a}_6$ is defined as follows: $\overline{a}_6 = (V_o V_1 \ldots V_{23})$. This new vector is reconstructed by the equations in Table III.

TABLE III

| | | | | | | | | | | | | | | |
|---|---|---|---|---|---|---|---|---|---|---|---|---|---|---|
| $V_0$ | = | $r_0$ | | | | | | | | | | | | |
| $V_1$ | = | $r_0$ | = | $r_9$ | + | $r_{10}$ | + | $r_{12}$ | + | $r_{13}$ | + | $r_{18}$ | + | $r_{22}$ |
| $V_2$ | = | $r_0$ | + | $r_3$ | + | $r_8$ | + | $r_{12}$ | + | $r_{13}$ | + | $r_{14}$ | + | $r_{22}$ |
| $V_3$ | = | $r_3$ | | | | | | | | | | | | |
| $V_4$ | = | $r_0$ | + | $r_7$ | + | $r_8$ | + | $r_9$ | + | $r_{12}$ | + | $r_{14}$ | + | $r_{18}$ |
| $V_5$ | = | $r_0$ | + | $r_7$ | + | $r_8$ | + | $r_{10}$ | + | $r_{11}$ | + | $r_{12}$ | + | $r_{13}$ |
| $V_6$ | = | $r_0$ | + | $r_8$ | + | $r_{10}$ | + | $r_{11}$ | + | $r_{14}$ | + | $r_{18}$ | + | $r_{22}$ |
| $V_7$ | = | $r_7$ | | | | | | | | | | | | |
| $V_8$ | = | $r_8$ | | | | | | | | | | | | |
| $V_9$ | = | $r_9$ | | | | | | | | | | | | |
| $V_{10}$ | = | $r_{10}$ | | | | | | | | | | | | |
| $V_{11}$ | = | $r_{11}$ | | | | | | | | | | | | |
| $V_{12}$ | = | $r_{12}$ | | | | | | | | | | | | |
| $V_{13}$ | = | $r_{13}$ | | | | | | | | | | | | |
| $V_{14}$ | = | $r_{14}$ | | | | | | | | | | | | |
| $V_{15}$ | = | $r_0$ | + | $r_3$ | + | $r_7$ | + | $r_8$ | + | $r_9$ | + | $r_{10}$ | + | $r_{22}$ |
| $V_{16}$ | = | $r_0$ | + | $r_7$ | + | r [illegible] | + | $r_{11}$ | + | $r_{13}$ | + | $r_{14}$ | + | $r_{22}$ |
| $V_{17}$ | = | $r_0$ | + | $r_3$ | + | $r_7$ | + | $r_{10}$ | + | $r_{13}$ | + | $r_{14}$ | + | $r_{18}$ |
| $V_{18}$ | = | $r_{18}$ | | | | | | | | | | | | |
| $V_{19}$ | = | $r_0$ | + | $r_3$ | + | $r_8$ | + | $r_9$ | + | $r_{11}$ | + | $r_{13}$ | + | $r_8$ |
| $V_{20}$ | = | $r_0$ | + | $r_4$ | + | $r_7$ | + | $r_{11}$ | + | $r_{12}$ | + | $r_{18}$ | + | $r_{22}$ |
| $V_{21}$ | = | $r_3$ | + | $r_7$ | + | $r_8$ | + | $r_9$ | + | $r_{10}$ | + | $r_{11}$ | + | $r_{12}$ |
| | | | | | | | | $r_{13}$ | + | $r_{14}$ | + | $r_{18}$ | + | $r_{22}$ |
| | = | $r_0$ | + | $r_8$ | + | $r_9$ | + | $r_{10}$ | + | $r_{13}$ | + | $r_{14}$ | + | $r_{20}$ |
| $V_{22}$ | = | $r_{22}$ | | | | | | | | | | | | |
| $V_{23}$ | = | $r_0$ | + | $r_3$ | + | $r_9$ | + | $r_{10}$ | + | $r_{11}$ | + | $r_{12}$ | + | $r_{14}$ |

All that remains to be done now is to determine which of the new newly generated vectors $\overline{a}_i$ is the one which has the minimum Hamming distance to $\overline{r}$, the received code word. To this end there is provided a set of 14 Hamming distance calculators such as 37,38. Hamming distance calculator 37 is connected to the output of multiplier 33 and to the output of holding register 32. Accordingly it compares the Hamming distance between $a_i$ and $\overline{r}$.

The output of the Hamming distance calculator 37 is a number corresponding to the Hamming distance. This is compared by a comparator 40 with a desired minimum Hamming distance impressed by the lead 41 on the comparator 40. In this example, the minimum distance is 4. Hence the comparator 40 compares two numbers. Accordingly, the set of comparators 40 will generate an output only if the calculated Hamming distance is no greater than the predetermined minimum Hamming distance. The output of comparator 40 is now impressed on an AND gate 43, the other input of the gate 43 being connected to the multiplier 33. If the output of comparator 41 is true the corresponding vector such as $\overline{a}_i$ is passed; otherwise not. Thus, one of the 14 new vectors corresponding to the multiplied code words is passed through an OR gate 44 into an output holding register 45 which now holds the corrected code word $\overline{a}_i$. This is then put into a parallel-to-serial converter 46 to provide the corrected data output on output terminal 47.

It will of course be understood that there is a comparator such as 40 for each Hamming distance calculator such as 37 and that one AND circuit such as 43 is associated with each comparator. Thus, the AND gates 43, the OR gate 44 and the output holding register 45 may be termed the code word selector.

It will be obvious from an inspection of FIG. 2 that the decoding can be effected in a minimum amount of time, that is faster than presently known decoders but with a relatively large expenditure of hardware.

It will therefore be apparent that there are certain advantages to a cyclic decoder of the type illustrated in FIG. 3 to which reference will now be made.

The cyclic decoder of FIG. 3 again includes an input register 31 to which an input lead 30 is connected. Its output is connected to a cycling register 50. The decoding requires only two multipliers 50 and 52. Both are hard wired. Multiplier 51 holds the vector $\overline{m}$ and complementary multiplier 52 holds the complementary vector $\overline{m}_c$. The cycling register 50 serves the purpose of cyclically shifting the received code vector or code word $\overline{r}$. This will generate all possible vectors of the code word. Accordingly, the decoding is performed in 23 bit times corresponding to 23 cyclic shifts of the cyclic portion of the 24 bit code vector. The basic multiplier is selected to be $\overline{m}$ = 1 0 0 0 0 1 0 1 0 0 1 1 0 0 1 1 0 1 0 1 1 1 1. The 24th bit is zero. Besides the multiplier vector its complement is used.

The multiplying rules for the basic multiplier $\overline{m}$ hard-wired into the multiplier 51 of FIG. 3 are shown by Table IV.

TABLE IV

| | | | | | | | | | | | | | | |
|---|---|---|---|---|---|---|---|---|---|---|---|---|---|---|
| $a_1$ | = | $r_0$ | + | $r_5$ | + | $r_{14}$ | + | $r_{15}$ | + | $r_{19}$ | + | $r_{20}$ | + | $r_{21}$ |
| $a_2$ | = | $r_0$ | + | $r_5$ | + | $r_7$ | + | $r_{10}$ | + | $r_{15}$ | + | $r_{17}$ | + | $r_{19}$ |
| $a_3$ | = | $r_0$ | + | $r_{11}$ | + | $r_{14}$ | + | $r_{15}$ | + | $r_{17}$ | + | $r_{19}$ | + | $r_{22}$ |
| $a_4$ | = | $r_0$ | + | $r_7$ | + | $r_{10}$ | + | $r_{11}$ | + | $r_{14}$ | + | $r_{15}$ | + | $r_{20}$ |
| $a_6$ | = | $r_0$ | + | $r_5$ | + | $r_7$ | + | $r_{11}$ | + | $r_{15}$ | + | $r_{21}$ | + | $r_{22}$ |
| $a_8$ | = | $r_0$ | + | $r_5$ | + | $r_7$ | + | $r_{14}$ | + | $r_{17}$ | + | $r_{20}$ | + | $r_{22}$ |
| $a_9$ | = | $r_0$ | + | $r_5$ | + | $r_{10}$ | + | $r_{11}$ | + | $r_{19}$ | + | $r_{20}$ | + | $r_{22}$ |
| $a_{12}$ | = | $r_0$ | + | $r_7$ | + | $r_{10}$ | + | $r_{14}$ | + | $r_{19}$ | + | $r_{21}$ | + | $r_{22}$ |
| $a_{13}$ | = | $r_0$ | + | $r_7$ | + | $r_{11}$ | + | $r_{17}$ | + | $r_{19}$ | + | $r_{20}$ | + | $r_{21}$ |
| $a_{16}$ | = | $r_0$ | + | $r_5$ | + | $r_{10}$ | + | $r_{11}$ | + | $r_{14}$ | + | $r_{17}$ | + | $r_{21}$ |
| $a_{18}$ | = | $r_0$ | + | $r_{10}$ | + | $r_{15}$ | + | $r_{17}$ | + | $r_{20}$ | + | $r_{21}$ | + | $r_{22}$ |
| $a_{23}$ | = | $r_5$ | + | $r_7$ | + | $r_{10}$ | + | $r_{11}$ | + | $r_{14}$ | + | $r_{15}$ | + | $r_{17}$ |
| | | | | | | | + | $r_9$ | + | $r_{20}$ | + | $r_{21}$ | + | $r_{22}$ |
| | = | $r_0$ | + | $r_5$ | + | $r_7$ | + | $r_{11}$ | + | $r_{17}$ | + | $r_{19}$ | + | $a_{18}$ |

Accordingly $\overline{m}$ is used to compute $\overline{a} = r \times \overline{m}$. In this case the bits of $\overline{r}$ which is the received code word in the one's position of $\overline{m}$ are treated as information bits of vector $\overline{a}$. The parity check bits are composed according to Table IV. Similarly, another vector is obtained by using the complement of $\overline{a}$.

Again we now have to compute the Hamming distance of the newly generated vectors $\overline{a}_i$ and $\overline{a}_j$, the latter being generated by the complementary multiplier $\overline{m}_c$. Therefore, a Hamming distance calculator 54 with its input connected both to the cycling register 50 and the multiplier 51 determines the Hamming distance between these two vectors which may be designated $HD_i$. Similarly, the associated Hamming distance calculator 55 is connected to the output of cycling register 50 and hard wired complementary multiplier 52 and generates a corresponding Hamming distance $HD_j$.

The two calculated Hamming distances are impressed on a Hamming distance comparator and selector 56. It generates one output on lead 57 designated $HD_s$ which is the smaller of the two numbers $HD_i$ and $HD_j$. It also generates an output on lead 58 if $HD_i$ is smaller than $HD_j$.

Lead 57 is connected both to a comparator 60 and a register 61. The register 61 stores the Hamming distance $HD_r$ which is the previously calculated smallest Hamming distance. The comparator 60 now compares $HD_s$ with $HD_r$. The result of the comparison is impressed on a holding register 63. At the same time a code selector 64 receives a signal from lead 58 whether $HD_i$ is smaller than $HD_j$ or not. Accordingly, if this is true, $\overline{a}_i$ is stored in the selector 64. If not, the vector $\overline{a}_j$ is stored in the selector 64.

This process now continues until all possible multiplied vectors are generated and the one with the smallest Hamming distance is found. This code word is then propagated from code selector 64 through holding register 63 into a parallel-to-serial register 66 from which the correct code word may be obtained by its output lead 67.

Figure 4:
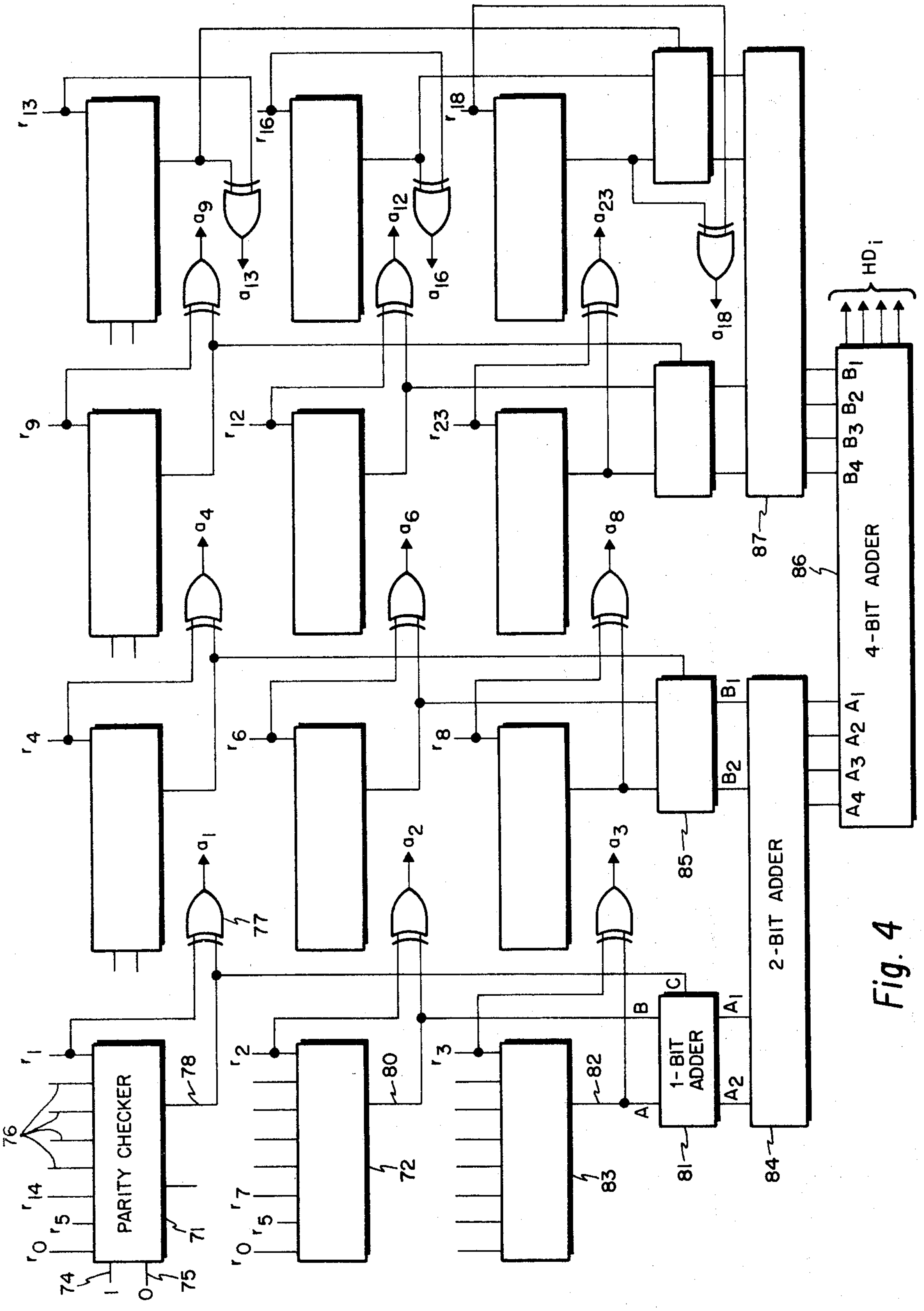
FIG. 4 is a block diagram of a hard-wired multiplier and Hamming distance calculator suitable for the decoder of FIG. 2.

FIG. 4 to which reference is made illustrates in somewhat greater detail the Hamming distance calculators such as 37 and 38 of FIG. 2. In other words FIG. 4 relates to some of the details for the simultaneous decoder. The circuit of FIG. 4 includes a plurality of parity checkers shown at 71, 72 . . . The parity checker 71 has a one and a zero input 74 and 75 on which the even or odd parity check bit is impressed. The parity checker also has a series of input leads jointly designated 76. On these leads are impressed selected bits of the received vector *r*, these bits being selected in accordance with the recursion relation of Table II. A selected one of the bits such as $r_1$ of parity checker 74 or $r_2$ of parity checker 72 is impressed on its associated exclusive OR circuit 77. An exclusive OR operation is defined by the following truth table.

TABLE V

| A | B | A⊕B |
|---|---|---|
| 0 | 0 | 0 |
| 0 | 1 | 1 |
| 1 | 0 | 1 |
| 1 | 1 | 0 |

The other input to the exclusive OR circuit 77 is a lead 78 from the parity checker which corresponds to an odd parity sum of the circuit input bits. The output of circuit 77 provides the estimate of $r_7$.

Parity checker 72 has a similar output lead 80 on which the odd sum of the impressed bits appears. A one-bit adder 81 has its input connected to output lead 80 of parity checker 72 and to the corresponding odd sum output lead 82 of parity checker 83. The sum corresponding to A obtained from output lead 82 is now added to the bit C from output lead 78. Similarly, bits B and C are added in the one-bit adder 81. The thus obtained two output bits $A_1$ and $A_2$ are impressed on the input of a two-bit adder 84.

Similarly, another two-bit adder 85 will add up separately the bits from the next set of three parity checkers to obtain two added bits designated $B_1$ and $B_2$. These four bits are added in pairs and are impressed on a four-bit adder 86 which adds the four bits obtained from two-bit adder 84 with another four bits obtained from a similar four-bit adder 87. The output of the four-bit adder sums the number of disagreement bits between the two vectors which is $HD_i$, that is the Hamming distance of the entire vector impressed on the circuit of FIG. 4. The code word with the lowest Hamming distance is finally impressed on the output holding register 45 is shown in FIG. 2.

It will be understood that a circuit similar to that of FIG. 4 will be used for calculating the minimum Hamming distance $HD_j$.

Figure 5:
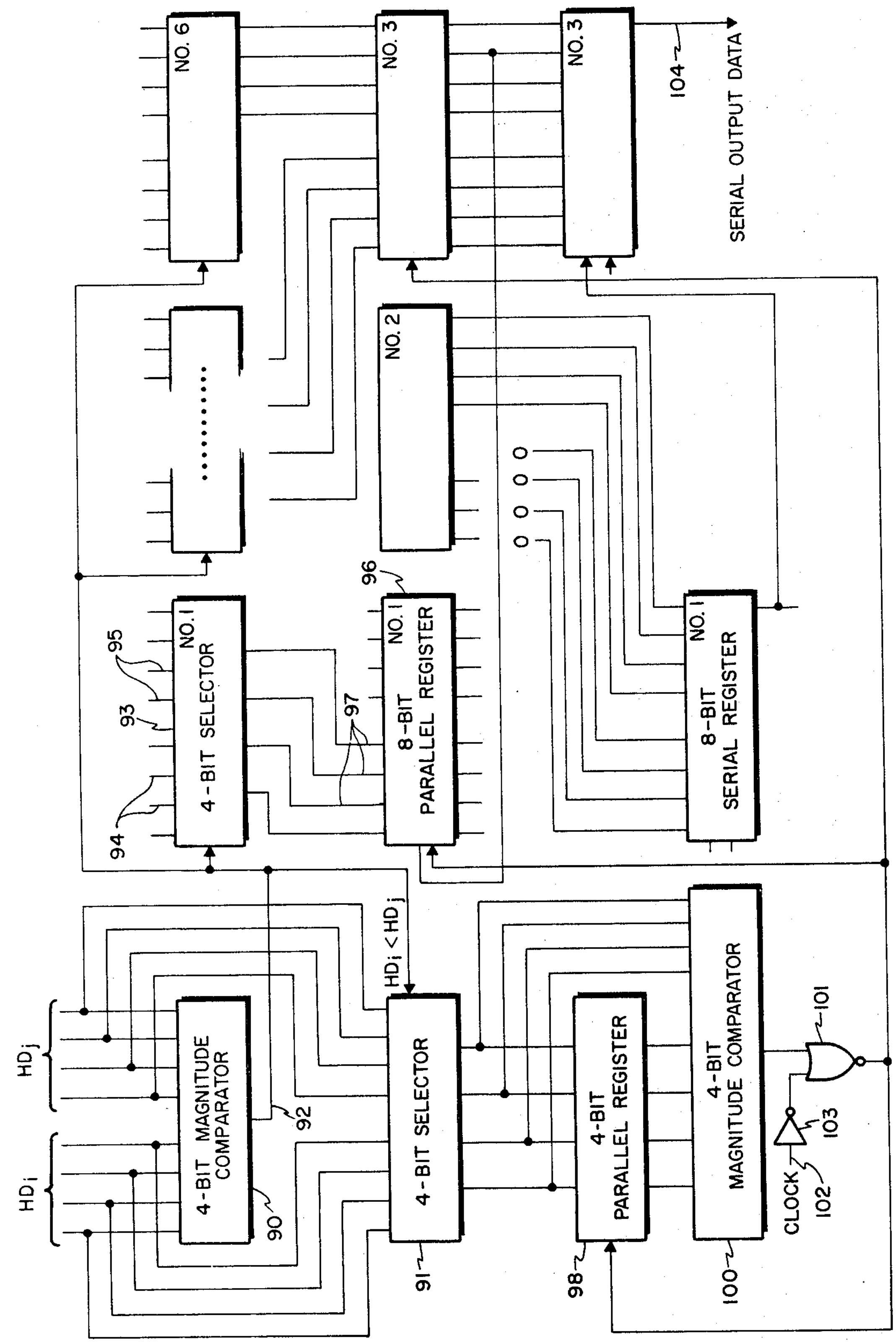
FIG. 5 is a block diagram of the output portion of the cyclic decoder of FIG. 3 which makes the decision which code vectors of the several successively calculated vector has the lowest Hamming distance with respect to the original code word.

Reference is now made to FIG. 5 illustrating the output portion of the cyclic decoder of FIG. 3. In other words, this figure shows in greater detail how the various Hamming distances HD are computed. Essentially, the circuit of FIG. 5 represents the Hamming distance comparator and selector 56.

The two Hamming distances or numbers $HD_i$ and $HD_j$ from the two multipliers 51 and 52 are impressed on a four-bit magnitude comparator 90 as well as on a four-bit selector 91. The comparator controls the four-bit selector to select the smaller value between $HD_i$ and $HD_j$ and also controls a 24-bit selector which consists of six four-bit selector NO1 to NO6 to present the product vector $\bar{a}_i$ or $\bar{a}_j$ associated with the smaller distance to its output.

The output of the four-bit selector 91 is impressed both on a four-bit parallel register 98 and on a four-bit magnitude comparator 100.

The magnitude comparator 100 compares the previously received lowest Hamming distance $HD_x$ and compares it with the smaller one of the two presently generated Hamming distances $HD_i$ and $HD_j$. The output of the magnitude comparator 100 is fed through an OR circuit 101 which is operated by a clock signal 102 through an inverter 103. The output of the OR circuit 101 is fed back to the parallel register 98 and to the parallel register 96 to generate a clock pulse if a smaller distance is detected. The clock pulse will also shift the product vector with the smaller distance into the 24-bit storage register formed by three 8-bit shift registers 96, etc. This process repeats for 23 bit times. The product vector with the minimum distance from the received code vector is then found and the information portion of the product vector is converted to a serial data stream at output lead 104.

There has thus been disclosed a decoder for cyclic group codes over a finite algebraic field. The decoding procedure is simpler than those of the prior art. It makes it psosible to decode certain group codes which could not be decoded in the past because of the complexity of the necessary decoding steps. Furthermore, the implementation of the decoder of the present invention is relatively simple. It can be carried out simultaneously or else in a cyclic fashion. A simultaneous decoder requires more hardware but can operate at a data rate substantially higher than conventional decoders. The cyclic decoder requires more time but less hardware than the simultaneous decoder. Examples of decoders have been given and it has been indicated that it can be proven that there is such a multiplier for any cyclic code over a finite algebraic field. The decoder of the present invention should also make it feasible to utilize cyclic codes which could not be practically used in the past because they did not possess the required mathematical structure which made decoding by prior art methods possible.

What is claimed is:

1. The method of decoding and correcting errors in a received code word subject to errors of a group code over a finite, algebraic field, said method comprising the steps of:

a. multiplying the received code word represented by electrical signals with each one of a predetermined set of multiplier vectors represented by electrical signals, thereby to obliterate certain positions of the received code word and to generate a set of code vectors;

b. reconstituting the obliterated positions of each code vector by a predetermined linear recursion relation; and c. determining which of the newly reconstituted code vectors has the closest Hamming distance to the received code word, whereby the closest reconstituted vector is the decoded code word.

2. The method defined in claim 1 wherein the code is a cyclic code and the set of multiplier vectors is a cyclic set of vectors.

3. The method defined in claim 2 wherein the received code word is multiplied simultaneously with the entire set of the multiplier vectors.

4. The method defined in claim 2 wherein the received code word is multiplied sequentially with the set of multiplier vectors.

5. The method defined in claim 1 wherein the received code word is multiplied with a vector of the set of multipliers and is simultaneously reconstituted.

6. The method of decoding and correcting errors in a received code word subject to errors and of a cyclic group code over a finite, algebraic field, said method comprising the steps of:

a. masking predetermined positions of the received code word represented by electrical signals by means of each one of a predetermined set of multiplier vectors represented by electrical signals to obliterate predetermined positions of the received code word and to generate a set of code vectors;

b. reconstituting the obliterated positions of each code vector by an independent set of coordinates determined by a linear recursion relation; and c. determining which of the newly reconstructed code vectors has the closest Hamming distance to the received code word, whereby the closest reconstituted vector is the decocded code word.

7. The method of decoding and correcting errors in a received code word forming a vector of a cyclic group code over a finite algebraic field, said method comprising the steps of:

a. cyclically shifting the received code word represented by electrical signals subject to errors to generate a set of code word vectors;

b. multiplying each of the code word vectors cyclically with at least one multiplier represented by electrical signals, said multiplier belonging to a cyclic set, thereby to obliterate certain positions of the received code word and to generate a set of multiplied code vectors;

c. reconstituting the obliterated positions of each multiplied code vector by a predetermined linear recursion relation; and d. determining which of the newly reconstituted code vectors has the closest Hamming distance to the received code word, whereby the closest reconstituted vector is the decoded code word.

8. The method defined in claim 7 wherein each of the code word vectors is simultaneously multiplied and reconstituted.

9. Apparatus for decoding and for correcting the errors of a received code word, said code word existing in a group code over an algebraic finite field, said apparatus comprising:

a. a register for holding the received code word;

b. a multiplier matrix coupled to said register for multiplying the code word with a set of multiplier vectors to generate a set of multiplied code vectors, thereby to obliterate predetermined positions of the received code word;

c. a recursion matrix coupled to said multiplier matrix for reconstituting the obliterated positions of each of the multiplied code vectors;

d. a minimum distance comparator coupled to said recursion matrix for determining that multiplied and reconstituted code vector having the minimum Hamming distance with respect to the received code word; and e. means coupled to said comparator for developing the decoded code word.

10. Apparatus for decoding and for correcting the errors of a received code word, said code word existing in a group code which is a cyclic code over an algebraic finite field, said apparatus comprising:

a. a cycling register for holding and for cyclically shifting the received code word;

b. a multiplier coupled to said cycling register for multiplying each of the cyclically shifted code vectors with at least one multiplier vector to generate a set of multiplied code vectors, thereby to obliterate predetermined positions of the received code word;

c. recursion means coupled to said multiplier for reconstituting the obliterated positions of each of the multiplied code vectors;

d. minimum distance comparator means coupled to said recursion means for determining that multiplied and reconstituted code vector having the minimum Hamming distance with respect to the received code word; and e. means coupled to said comparator for developing the decoded code word.

11. Apparatus as defined in claim 10 wherein each of the cyclically shifted code vectors is multiplied in sequence by said multiplier.

12. Apparatus for decoding and for correcting the errors of a received code word, said code word existing in a cyclic group code over an algebraic finite field, said apparatus comprising:

a. a register for holding the received code word;

b. a plurality of multipliers, each coupled to said register, each multiplier multiplying the received code word with a particular one of a set of multiplier vectors to generate a set of multiplied code vectors, thereby to obliterate predetermined positions of the received code word, each multiplier being so arranged in accordance with a predetermined recursion relation to reconstitute the obliterated positions of each of the multiplied code vectors, thereby to generate a set of reconstituted code vectors;

c. minimum distance comparator means coupled to each of said multipliers for determining the one reconstituted code vector from the set of reconstituted code vectors having the minimum Hamming distance with respect to the received code word; and d. output means coupled to said distance comparator means for generating the decoded code word.

13. Apparatus for decoding and for correcting the errors of a received code word, said code word existing in a cyclic group code over an algebraic finite field, said apparatus comprising:

a. a cycling register for holding the received code word and cyclically shifting it to generate a plurality of code vectors;

b. two multipliers coupled to said cyclic register, one for multiplying each code vector with a multiplier and the other one for multiplying the same code vector with the complementary multiplier, each multiplier being arranged to reconstitute the obliterated positions of each multiplied code vector in accordance with a predetermined recursion relation;

c. minimum distance calculator and comparator means coupled to said multipliers for successively determining the reconstituted code vector having the minimum Hamming distance with respect to the received code word; and d. means coupled to said calculator and comparator means for generating the decoded code word.

* * * * *